(12) United States Patent
Richmond

(10) Patent No.: US 7,429,827 B2
(45) Date of Patent: *Sep. 30, 2008

(54) SOLAR POWERED LIGHT ASSEMBLY TO PRODUCE LIGHT OF VARYING COLOURS

(76) Inventor: Simon Nicholas Richmond, 992 Mercer Rd., Princeton, NJ (US) 08450

( * ) Notice: Subject to any disclaimer, the term of this patent is extended or adjusted under 35 U.S.C. 154(b) by 649 days.

This patent is subject to a terminal disclaimer.

(21) Appl. No.: 11/102,229

(22) Filed: Apr. 7, 2005

(65) Prior Publication Data

US 2005/0248285 A1 Nov. 10, 2005

Related U.S. Application Data

(63) Continuation-in-part of application No. 10/789,488, filed on Feb. 26, 2004, now Pat. No. 7,196,477.

(30) Foreign Application Priority Data

Dec. 23, 2003 (AU) .............................. 2003271383

(51) Int. Cl.
*H05B 41/36* (2006.01)

(52) U.S. Cl. ...................................... 315/149; 315/152

(58) Field of Classification Search ......... 315/149–152, 315/153, 154; 362/800, 276, 183, 194, 249–252
See application file for complete search history.

(56) References Cited

U.S. PATENT DOCUMENTS

| | | | | | |
|---|---|---|---|---|---|
| 3,757,511 | A | * | 9/1973 | Burgess et al. ................ | 368/83 |
| 4,240,021 | A | * | 12/1980 | Kashima et al. ............. | 320/101 |
| 4,999,060 | A | | 3/1991 | Szekely et al. ............... | 136/251 |
| 5,062,028 | A | | 10/1991 | Frost et al. ................... | 362/183 |
| 6,016,038 | A | | 1/2000 | Mueller et al. .............. | 315/291 |
| 6,120,165 | A | | 9/2000 | Shalvi ......................... | 362/276 |
| 6,150,774 | A | | 11/2000 | Mueller et al. .............. | 315/291 |
| 6,459,919 | B1 | | 10/2002 | Lys et al. ..................... | 600/407 |
| 6,517,217 | B1 | * | 2/2003 | Liao ............................ | 362/235 |
| 6,528,782 | B1 | * | 3/2003 | Zhang et al. ................ | 250/226 |
| 6,608,453 | B2 | | 8/2003 | Morgan et al. .............. | 315/312 |
| 6,729,742 | B2 | | 5/2004 | Wismeth et al. ............ | 362/183 |
| 6,769,907 | B2 | | 8/2004 | Doud .......................... | 431/350 |
| 6,784,357 | B1 | | 8/2004 | Wang .......................... | 136/244 |
| 6,881,893 | B1 | | 4/2005 | Cobert ........................ | 136/246 |
| 7,064,498 | B2 | | 6/2006 | Dowling et al. ............. | 315/291 |
| 7,196,477 | B2 | * | 3/2007 | Richmond ................... | 315/149 |
| 2003/0137831 | A1 | | 7/2003 | Lin .............................. | 362/183 |
| 2005/0156103 | A1 | | 7/2005 | May et al. ................... | 250/228 |

* cited by examiner

*Primary Examiner*—David Hung Vu
*Assistant Examiner*—Minh Dieu A

(57) ABSTRACT

A garden light (10) having a body (11) with a post (12), the lower end of which is provided with a spike (13). The upper end of the post (11) receives a lens assembly (12). Secured to the lens assembly (12) is a cap assembly (24) that has three LEDs that are activated to produce a varying color light.

35 Claims, 8 Drawing Sheets

FIG. 13

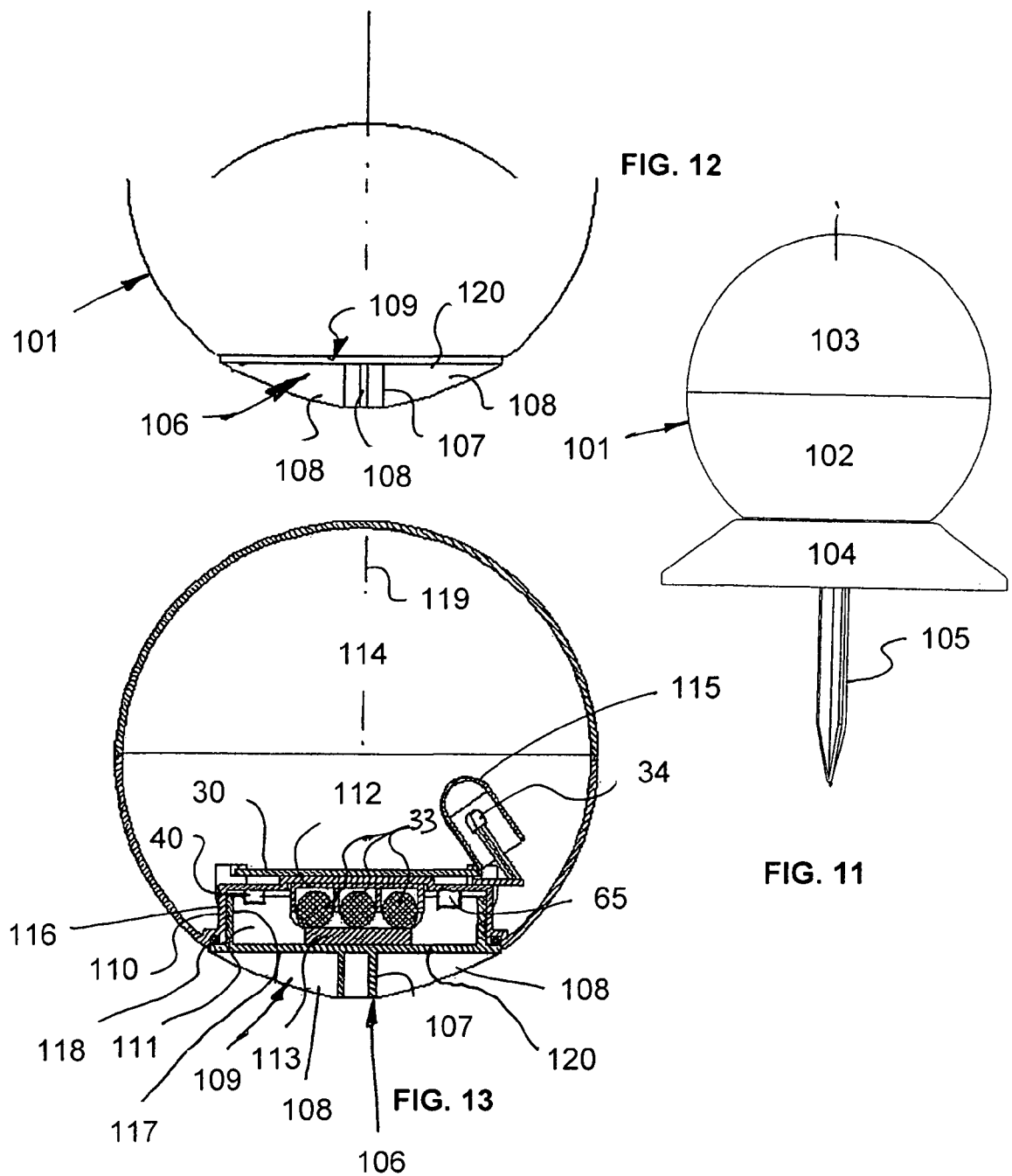

SOLAR POWERED LIGHT ASSEMBLY TO PRODUCE LIGHT OF VARYING COLOURS

This application is a Continuation-In-Part of U.S. patent application Ser. No. 10/789,488, filed on Feb. 26, 2004, now U.S. Pat. No. 7,196,477, which claims priority to Australian Patent Application No. 2003271383, filed on Dec. 23, 2003.

TECHNICAL FIELD

The present invention relates to solar powered lights and more particularly but not exclusively to solar powered lights that produce a light of varying colour.

BACKGROUND OF THE INVENTION

Light devices that employ light emitting diode (LED) systems to produce a variable colour are known. Examples are described in U.S. Pat. Nos. 6,459,919, 6,608,458, 6,150,774 and 6,016,038. It is also known to have "garden lights" that are solar powered. For example such garden lights include a body providing a spike that is driven into a ground surface. At the upper end of the spike there is mounted a diffuser surrounding a lamp, with the lamp being driven by rechargeable batteries and a solar cell.

The abovementioned lighting apparatus have a number of disadvantages including difficulty in adjusting the various lighting functions and not producing a uniform desired colour when required to do so.

OBJECT OF THE INVENTION

It is the object of the present invention to overcome or substantially ameliorate at least one of the above disadvantages.

SUMMARY OF THE INVENTION

There is disclosed herein a lighting device to produce light of varying colour, said device including:
a body;
a lens mounted on the body and generally enclosing a chamber having an upper rim surrounding a top opening, and a bottom region;
a reflector mounted in the bottom region;
a cap assembly including securing means to releasably engage the rim so that the cap assembly can be selectively removed from the lens; said assembly including:
a base;
a circuit having at least two lamps of different colours which are activated to produce a desired colour including a varying colour, the lamps being mounted to direct light into said chamber, a solar cell mounted on an exposed surface of the assembly and rechargeable batteries to power the circuit, a light sub-circuit connected to the lamps to deliver electric power thereto so that the lamps produce said desired colour, and a switch operable to deliver electric power from the batteries and cell to said sub-circuit, the switch being exposed to provide for access thereto by a user.

Preferably, said circuit includes a light sensitive switch that renders the circuit operation at low light levels.

Preferably, said switch is on an exposed downwardly facing surface.

Preferably, said circuit includes three lamps, each of a different colour.

Preferably, said lens is a first lens, and said device includes a second lens, said second lens being attached to said base and providing a cavity into which the LEDs direct light, with the light leaving said second lens then passing through said first lens.

Preferably, the first and second lenses diffuse light.

Preferably, said body includes a post having opposite first and second ends, with a spike attached to said first end, and said first lens attached to said second end.

Preferably, said second lens is detachably secured to said post.

Preferably, said switch is a first switch, and second sub-circuit includes an integrated circuit and a second switch connected to said integrated circuit, the second switch being exposed to provide for access thereto by a user.

Preferably, said second switch activates said integrated circuit to select a desired colour.

Preferably, said second switch is on said exposed surface.

There is further disclosed herein a lighting device to produce light of varying colour, said device including:
a body;
a lens mounted on the body and generally enclosing a chamber;
a circuit having at least two lamps of different colours to produce a desired colour including a varying colour, the lamps being mounted to direct light into said chamber, connections for at least one rechargeable battery to power the circuit and a solar cell mounted on an exposed surface of the assembly and operatively associated with the connections to charge the battery, and a switch operated to control delivery of electric power from the battery to operate said circuit, the switch being exposed to provide for access thereto by a user.

Preferably, said circuit includes a light sensitive switch that renders the circuit operative at low light levels.

Preferably, said circuit includes a light sub-circuit connected to the lamps to deliver electric power thereto so that the lamps produce said desired colour, with said switch being an on/off switch to deliver electric power from the batteries to said sub-circuit.

Preferably, said circuit includes a light sub-circuit having an integrated circuit operable to select a desired fixed colour, with said switch being connected to said integrated circuit and operable to select said desired fixed colour.

Preferably, said circuit includes a sub-circuit, said switch is a first switch said first switch being an on/off switch to deliver electric power from the battery to said sub-circuit, and said sub-circuit includes an integrated circuit and a second switch connected to said integrated circuit, the second switch being operable to select a desired fixed colour and exposed to provide for access thereto by a user.

Preferably, said second switch is on said exposed external surface.

There is further disclosed a lighting device to produce light, said device including:
a base;
a lens mounted on the base and generally enclosing a chamber;
a circuit having at least one lamp to produce a light, the lamp being mounted to direct light into said chamber, connections for at least one rechargeable battery to power the circuit and a solar cell exposed to said chamber so as to receive light passing through said lens and operatively associated with the connections to charge the battery, and a primary switch operable to control to operate said circuit;
a battery compartment including a cavity to receive said battery and having said contacts;
a closure member attached to said compartment but movable relative thereto to expose said cavity to provide for insertion of said battery; and wherein said switch is exposed to said cavity so that upon movement of said closure member to expose said cavity, a user has access to said switch to operate the switch.

Preferably, device has at least two lamps to produce light of a desired colour including a varying colour.

Preferably, said circuit includes a light sensitive switch that renders the circuit operative at low light levels.

Preferably, said circuit includes a light sub-circuit connected to the lamps to deliver electric power thereto so that the lamps produce said desired colour, with said switch being an on/off switch to deliver electric power from the batteries to said sub-circuit.

Preferably, said circuit includes a light sub-circuit having an integrated circuit operable to select a desired fixed colour, with said switch being connected to said integrated circuit and operable to select said desired fixed colour.

Preferably, said circuit includes a sub-circuit, said switch is a first switch said first switch being an on/off switch to deliver electric power from the battery to said sub-circuit, and said sub-circuit includes an integrated circuit and a second switch connected to said integrated circuit, the second switch being operable to select a desired fixed colour and exposed to provide for access thereto by a user.

Preferably, said second switch is on said exposed external surface.

Preferably, said circuit includes a light sub-circuit connected to the lamps to deliver electric power thereto so that the lamps produce said desired colour, with said primary switch being an on/off switch to deliver electric power from the batteries to said sub-circuit.

Preferably, said circuit includes a light sub-circuit having an integrated circuit operable to select a desired fixed colour, with said integrated circuit being connected to a sub-circuit switch, the sub-circuit switch being operable to select said desired fixed colour.

Preferably, said circuit includes a sub-circuit, said primary switch is a first switch said first switch being an on/off switch to deliver electric power from the battery to said sub-circuit, and said sub-circuit includes an integrated circuit and a second switch connected to said integrated circuit, the second switch being operable to select a desired fixed colour and exposed to provide for access thereto by a user.

Preferably, said second switch is exposed to said chamber.

Preferably, said lens is fixed to said battery compartment and said battery compartment threadably engages said closure member so that relative rotation between the closure member and said compartment moves said closure member between an open position exposing said cavity and a closed position closing said cavity.

Preferably, said closure member includes a socket, and said device includes a spike engaged in said socket and projecting therefrom to provide for the spike to be inserted in a ground surface so that the device is supported thereby.

BRIEF DESCRIPTION OF THE DRAWINGS

A preferred form of the present invention will now be described by way of example with reference to the accompanying drawings wherein:

FIG. 11 is a schematic side elevation of a further lighting device;

FIG. 12 is a schematic side elevation of the lens portion of the device of FIG. 11; and FIG. 13 is a schematic sectioned side elevation of portion of the device of FIG. 11.

DETAILED DESCRIPTION OF THE PREFERRED EMBODIMENTS

Figure 1:
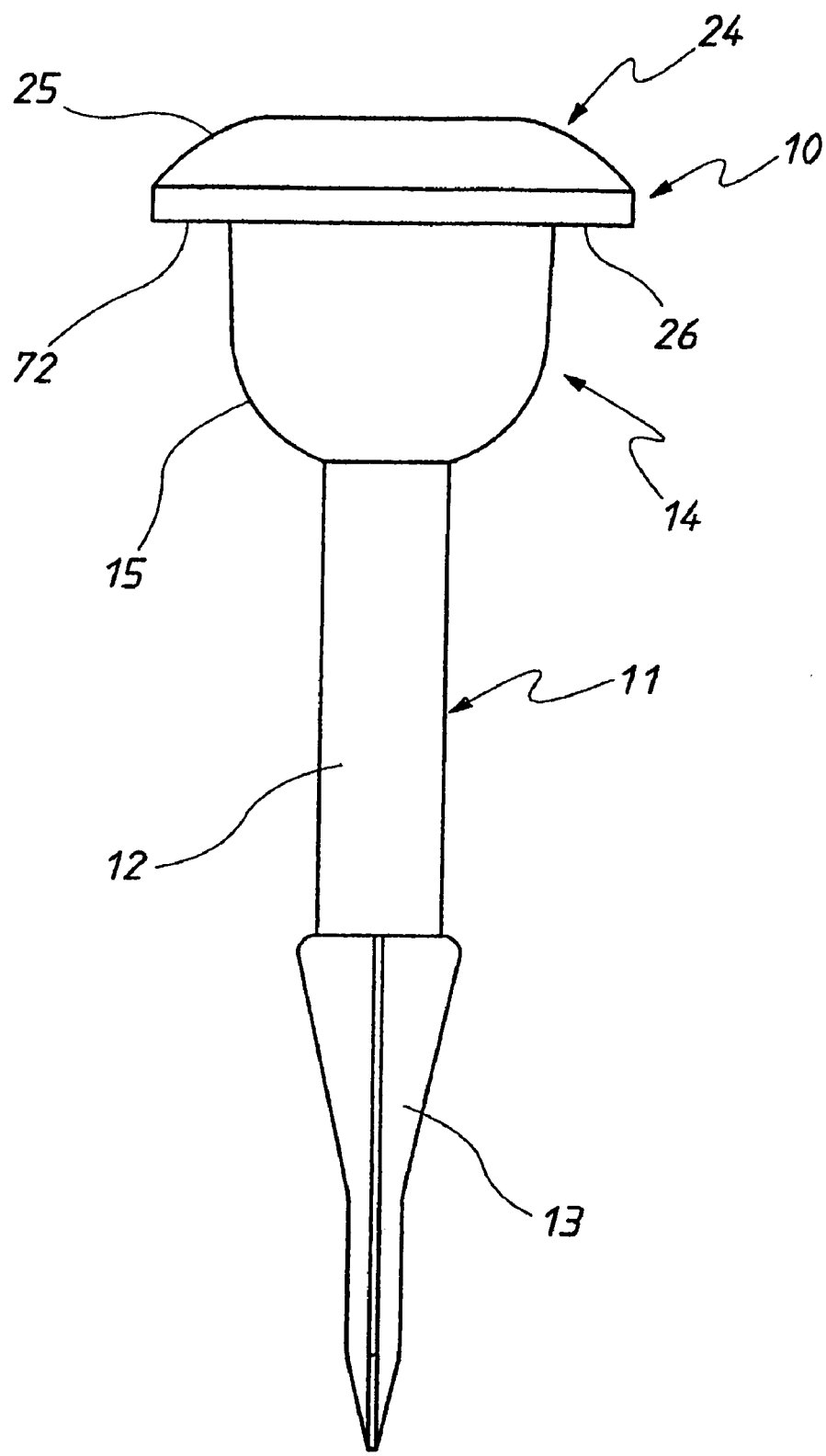
FIG. 1 is a schematic side elevation of a lighting device.
Figure 2:
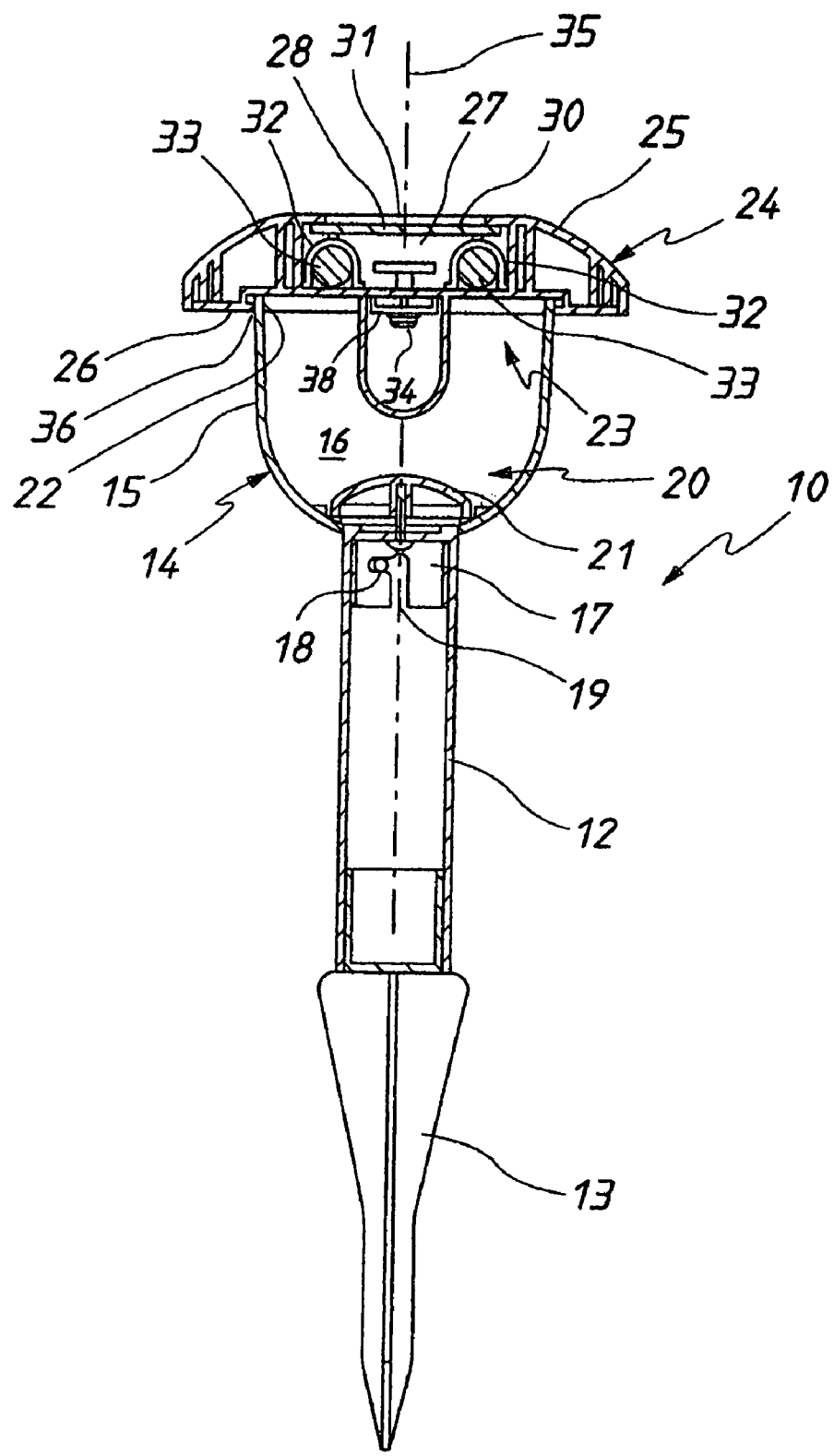
FIG. 2 is a schematic sectioned front elevation of the device of FIG. 1.
Figure 3:
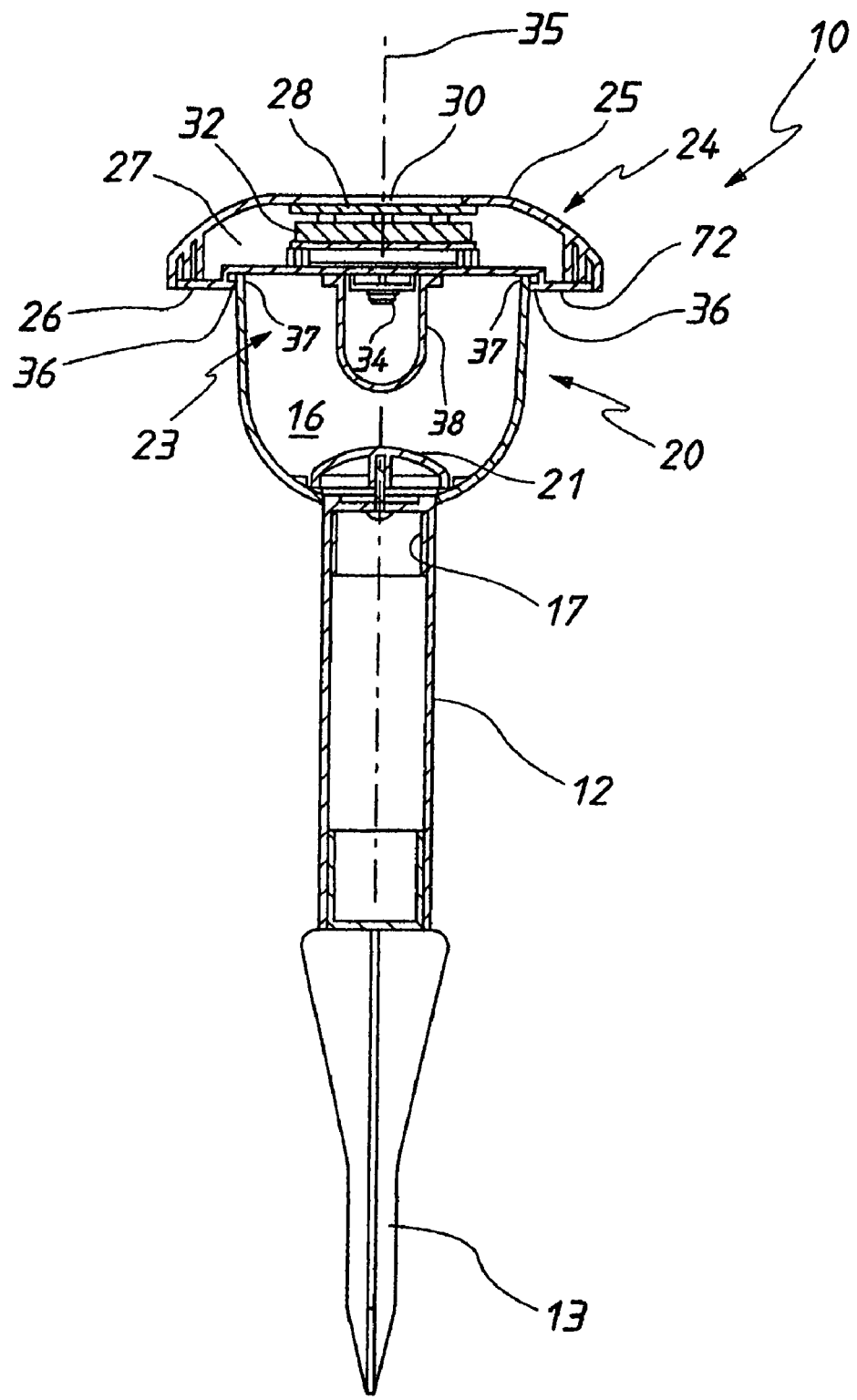
FIG. 3 is a schematic sectioned side elevation of the device of FIG. 1.
Figure 4:
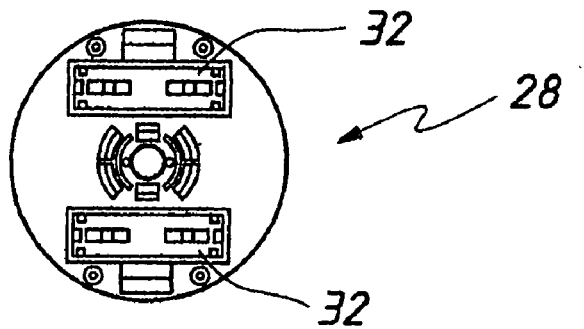
FIG. 4 is a schematic plan view of a moulding employed in the device of FIG. 1.
Figure 5:
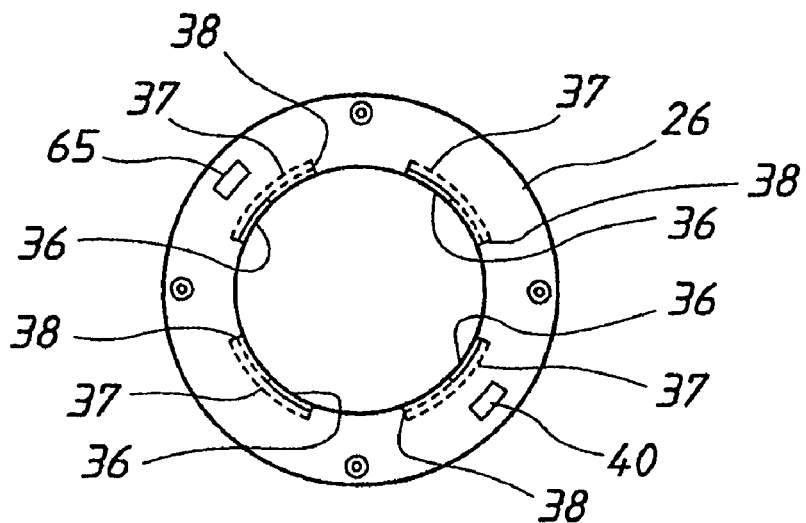
FIG. 5 is a schematic plan view of a base member of the device of FIG. 1.

In FIGS. 1 to 9 of the accompanying drawings there is schematically depicted a lighting device 10. The device 10 of this embodiment is configured as a "garden light". The device 10 includes a body 11 including a post 12 from the lower end from which there extends a spike 13. The spike 13 is driven into a ground surface so that the post 12 is exposed above the ground surface.

Attached to the upper end of the post 12 is a lens assembly 14. The lens assembly 14 includes a lens 15 that encompasses a chamber 16. The lower end of the lens 15 has fixed to it a "bayonet" fitting 17 that engages a shaft 18 fixed to the upper end of the post 12. The fitting 17 includes an "L" shaped slot 19 through which the shaft 18 passes to secure the lens assembly 14 to the upper end of the post 12.

The chamber 16 includes a lower portion 20 within which there is mounted an arcuate reflector 21 that is concave.

The lens 15 has a rim 22 surrounding the upper opening 23 of the lens 15.

Removably attached to the rim 22 is a cap assembly 24. The assembly 24 includes a cover 25 fixed to a base 26. The base 26 is located beneath the cover 25 and is shielded thereby. The base 26 and cover 25 encompass a chamber 27 within which there is a mounted moulding 28. The moulding 28 is provided with battery compartments 32. The components of the circuit 29 are located within the chamber 27, while the upper surface of the assembly 27 is provided with the solar cell 30. The cell 30 is exposed through a central rectangular aperture 31 of the cap 25.

Mounted within the chamber 27 via battery compartments 32 are rechargeable batteries 33 which are used to energise three LEDs 34. The LEDs 34 when illuminated produce red, green and blue light.

The cap assembly 24 is generally circular in configuration so as to provide the device 10 with a generally vertical longitudinal axis 35.

The base 26 has radially inward projecting flange segments 36 that engage with radially outward extending flange segments 37 of the rim 22 to be secured thereto. By angular movement of the cap assembly 24 about the axis 35, the segments 36 and 37 engage or disengage to secure or to release the assembly 24 with respect to the lens 15. As can be noted from FIG. 5, the flange segments 37 have end abutment portions 38 against which these segments 36 engage when the assembly 24 is secured to the lens 15.

Figure 6:
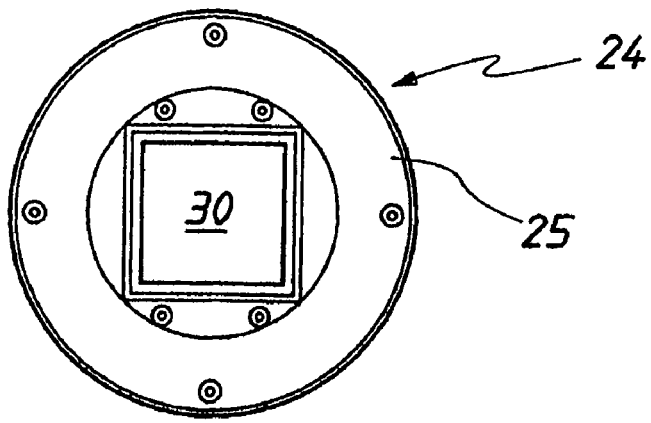
FIG. 6 is a schematic to plan view of a cap assembly employed in the device of FIG. 1.
Figure 7:
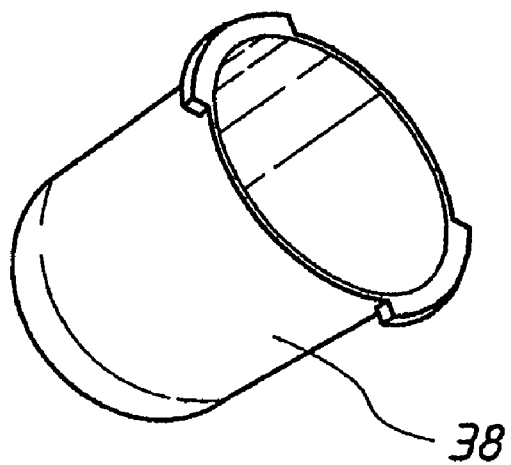
FIG. 7 is a schematic isometric view of a lens employed in the device of FIG. 1.
Figure 8:
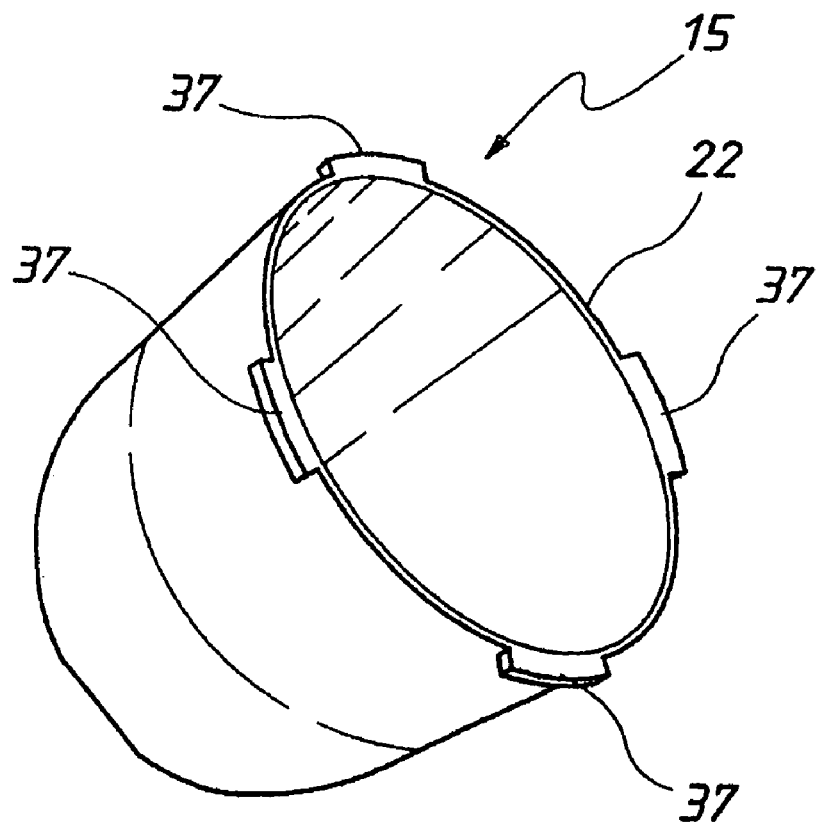
FIG. 8 is a schematic isometric view of a second lens employed in the device of FIG. 1.

As can be noted from FIG. 6, mounted on the under surface of the base 26 is a second lens 38. Accordingly, the LEDs 34 when activated have their light preferably diffused by the lens 38 and then further diffused by the lens 15. This in particular aids in producing a more evenly coloured light when the LEDs 34 are activated.

The circuit 29 powers and controls the lighting device 10 in accordance with an embodiment of this invention. The circuit 29 consists of a number of interconnected sub-circuits, including a power supply circuit, a light operated circuit, a boost-up circuit, a rectifier circuit, and a light circuit.

The power supply circuit comprises a solar cell 30 connected in series to a forward biased diode 39, which is in turn connected to a positive terminal of a battery 33. A negative terminal of the battery 33 is then connected to the solar cell 30 to complete the power supply circuit. In this example, the diode 39 is a model number IN5817 Schottky diode and the battery comprises two rechargeable 1.2 volt battery cells. It will be apparent to a person skilled in the art that other diode and battery configurations may be utilised without departing from the spirit and scope of the invention.

When the solar cell 30 is exposed to sufficient light, the solar cell converts some of the solar energy to electrical energy and creates a current that passes through the diode 39 to charge the battery 33. Thus, during the day the solar cell 30 converts energy from the sun to charge the battery 33. The diode 39 prevents the battery 33 from expending any power on the solar cell 30.

The power supply circuit is connected in parallel to the light operated circuit, which is connected across the terminals of the battery 33. The positive terminal of the battery 33 is connected to a switch 40, which is in turn connected to a 100 kΩ first resistor 41. The first resistor 41 is connected in series with a second, light-dependent resistor 42. The second resistor 42 connects to the negative terminal of the batteries 33 to complete the light operated circuit. The value of resistance of the second resistor 42 depends on the amount of light to which the second resistor 42 is exposed. When there is not much light, such as occurs during the night, the value of the second resistor 42 increases. During the daytime, when there is sufficient light, the value of the second resistor 42 decreases. Accordingly the resistor 42 allows the lighting device to operate only when there is insufficient light, ie night.

The boost-up circuit is connected to the light operated circuit, in parallel with the first resistor 41 and the second, light-dependent resistor 42. A first circuit node 43 is defined between the switch 40 and the first resistor 41. Connected to the node 43, is an emitter terminal of a first triode 44. A collector terminal of the first triode 44 is connected in series with a 100 kΩ third resistor 45. The third resistor 45 is then connected to a point between the first resistor 41 and the second resistor 42.

A 220 kΩ fourth resistor 46 is connected to node 43 across the emitter and base terminals of the first triode 44. In parallel with the fourth resistor 46, and also connected across the emitter and base terminals of the first triode 44, is a 4.7 nF first capacitor 48. Further connected to node 43, across the emitter and base terminals of the first triode 44 and in parallel with each of the fourth resistor 46 and the first capacitor 48, is a 100 µH inductor 49 in series with a 1 nF second capacitor 50. The second capacitor is then connected to the base terminal of the first triode 44.

A 20 kΩ fifth resistor 51 is connected across the base and collector terminals of the first triode 44. Connected across the terminals of the third resistor 45 are the collector and base terminals, respectively, of a second triode 52. The emitter terminal of the second triode 52 is connected to the negative terminal of the batteries 33.

Connected between the inductor 49 and the second capacitor 50 is the collector terminal of a third triode 53. The base terminal of the third triode 53 is connected via an intermediary circuit to the collector terminal of the second triode 52. The intermediary circuit consists of a 2.4 kΩ fourth resistor 54 in parallel with a 1 nF third capacitor 55. The emitter terminal of the third triode 53 is connected to the negative terminal of the battery 33.

Also connected between the inductor 49 and the second capacitor 50 is the rectifier circuit. A forward biased second diode 56 is connected to a point between the inductor 49 and the second capacitor 50, and then to a positive terminal of a 33 µF fourth capacitor 57. The negative terminal of the fourth capacitor 57 is connected to the negative terminal of the battery 33. A second circuit node 58 is defined between the second diode 56 and the fourth capacitor 57. Connected in parallel with the fourth capacitor 57, between the second node 58 and the negative terminal of the battery 33 is a reverse biased 4.5V third diode 59. The second diode 56, the fourth capacitor 57 and the third diode 59 comprise the rectifier circuit. Further connected to the second circuit node 58, in parallel with each of the capacitor 57 and the reverse diode 59, is a light circuit 60.

The light circuit 60 contains an integrated circuit (IC) 61 for controlling lighting effects provided by the lighting device 10. In the embodiments shown, the IC 61 is a 16-pin, three colour LED IC for controlling first, second and third light emitting diodes (LEDs) 34A, 34B and 34C. Each of pins 1, 15 and 16 is connected in series to respective switches 69, 70, 71. Each of the switches 69, 70 and 71 is then connected to the negative terminal of the battery 33. In one embodiment, the switches 69, 70, 71 correspond to the LEDs 34A, 34B, and 34C to enable or disable a particular colour range. In another embodiment, the switches 69, 70, 71 determine the frequency of a colour changing effect. In a further embodiment, the switches 69, 70, 71 determine the intensity of light emitted by each of the LEDs 34A, 34B, and 34C. Various combinations of the frequency and intensity of light are also possible. The switches 69, 70, 71 can be made accessible to a user to create custom lighting effects. Alternatively, the switches 69, 70, 71 are set according to a predetermined configuration and are not readily accessible by a user.

Pin 4 of the IC 61 enables an optional pause function. In this embodiment, pin 4 connects to a push button 65 that is, in turn, connected to the negative terminal of the batteries 33. Pin 3 of the IC 61 connects to the second circuit node 58.

Connected to the second circuit node 58, and in parallel with one another, are the first second and third forward biased light emitting diodes (LEDs) 34A, 34B and 34C. The first LED 34A is connected in series with a sixth resistor 66 that is connected to pin 13 of the IC 61. The second LED 34B is connected in series with a seventh resistor 67 that is connected to pin 12 of the IC 61. The third LED 34C is connected in series with an eighth resistor 68 that is connected to pin 11 of the IC 61. In this example, the first LED 34A is blue, the second LED 34B is green and the third LED 34C is red.

Pins 6 and 8 of the IC 61 are tied to one another via a ninth resistor 72, which in the embodiment shown is a 20 KΩ resistor. The valve of the ninth resistor 72 determines the frequency of a colour change created by the IC 61. Accordingly, using different resistor valves for the ninth resistor 72 produces colour changes of different frequencies. Pin 9 of the IC 61 is tied to the negative terminal of the battery 33.

During the day, the solar cell 30 charges the battery 33. The value of the second resistor 42 is low and, consequently, small amounts of current flow through the boost-up circuit, rectifier circuit and light circuit. As night falls, the amount of energy converted by the solar cell 30 decreases. The resistance of the second resistor 42 increases and more current flows into the boost-up circuit, rectifier circuit and light circuit. This activates the LEDs 34A, 34B, and 34C in the light circuit and the light device 10 produces a changing light effect.

The integrated circuit 61 controls each of the first, second and third LEDs 34A, 34B, and 34C to produce a changing light effect for the light device 10. The integrated circuit varies the frequency and intensity of light emitted by the LEDs 34A, 34B, and 34C to produce a constantly changing kaleidoscopic effect. The light device 10 displays a constantly changing lighting effect that cycles through the light spectrum by ramping up and ramping down the intensity of light displayed by the LEDs 34A, 34B, and 34C.

Connecting the optional pause function of pin 4 of the IC 61 to the push button 65 enables a user to stop the changing light effect and maintain a constant colour. In this manner, a user can select a preferred colour for a lighting effect. The user observes the changing colour effect and when a desired colour is displayed, the user depresses the pause button 65.

The colour displayed at the time that the button is pressed then remains on. Preferably, the circuit retains sufficient charge such that a user selected colour is retained during the day and is displayed again when the light is reactivated the following evening. In this manner, the user does not have to reselect a desired colour each night. To reinstate the changing light effect, the user presses the push button 65 again and the changing light effect resumes.

Figure 9:
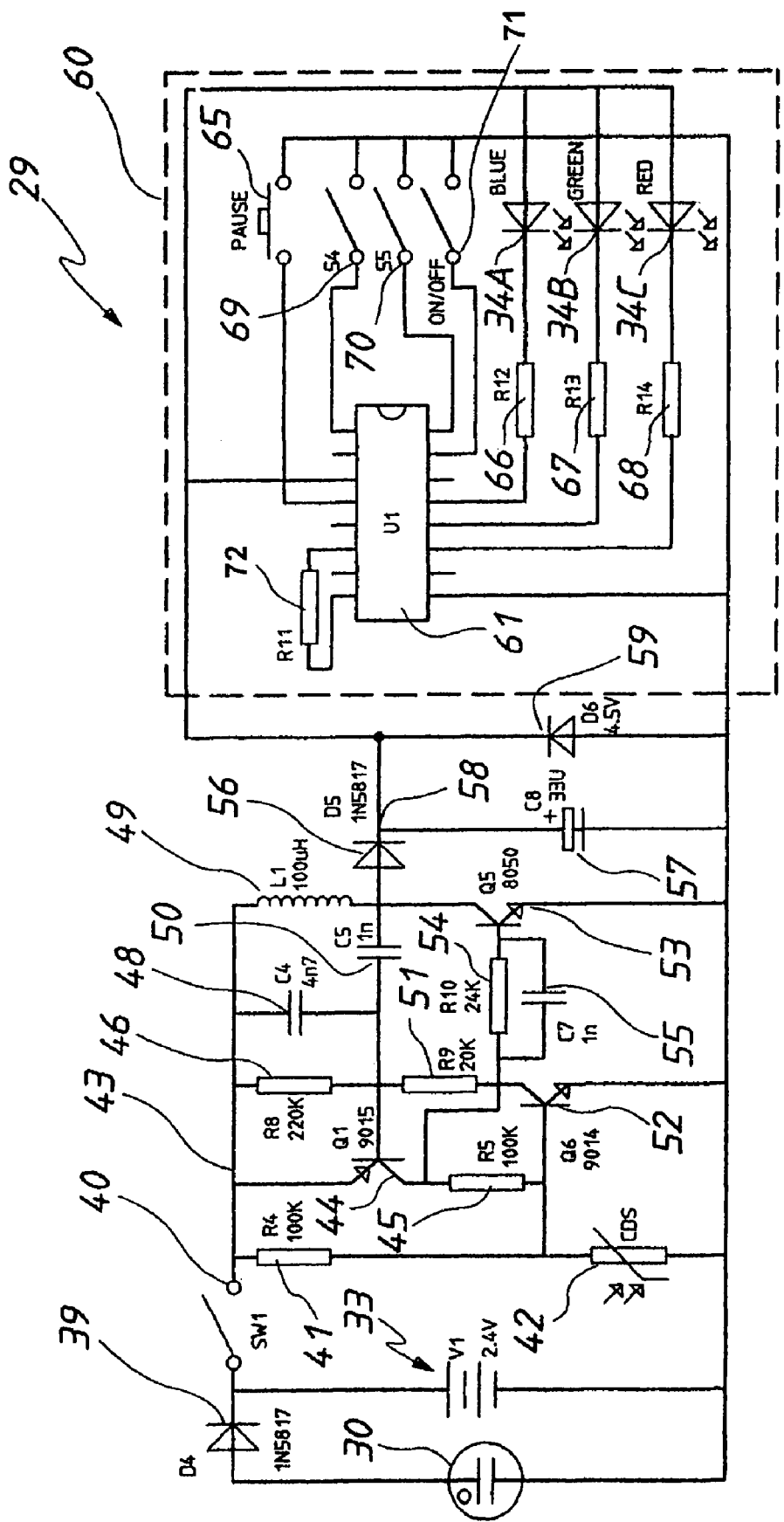
FIG. 9 is a circuit diagram of the circuit of the board of FIG. 4.

In the embodiment shown in FIG. 9, the battery 33 powers the light circuit 60 during the night to produce light of varying colours and the user can optionally select a desired colour by pushing the push button 65. A selected colour is retained by memory in the IC 61. The memory may be a switch. Whilst the battery is powering the light circuit 60, the fourth capacitor 57 stores charge. As stated above, it is desirable for a selected colour to be retained and displayed on successive nights. As the battery 33 discharges, the output voltage of the battery 33 decreases. When the output voltage of the battery 33 is less than the stored voltage of the capacitor 57, the capacitor 57 discharges. Due to the presence and arrangement of the diodes 56 and 59, the capacitor 57 discharges through the light circuit 60.

The IC 61 preferably includes a cut-off circuit that is voltage dependent. As the capacitor 57 discharges, the voltage across the cut-off circuit decreases. Once the voltage across the cut-off circuit reaches a predetermined threshold value, the cut-off circuit prevents further power being consumed by the LEDs. As no power is being consumed by the light circuit 60, the capacitor 57 retains a residual charge. The residual charge maintains a voltage across the IC 61, which enables the selected colour to be retained by the memory in the IC 61.

During the next day, the solar cell 30 recharges the battery 33. As night falls, the resistance of resistor 42 again increases and the battery 33 provides sufficient power to the light circuit 60 to increase the voltage across the cut-off circuit above the predetermined threshold value. The LEDs are activated and the selected colour, as retained in the memory of the IC 61, is displayed. The voltage provided by the battery 33 is more than the stored charge of the fourth capacitor 57, so the capacitor 57 again begins to store charge.

It will be readily apparent to a person skilled in the art that there are many circuit variations possible for enabling and controlling the lighting display, without departing from the spirit and scope of the invention.

The switch 40 and/or switch 65 is/are mounted on the base 26 so as to be on a downwardly facing external surface of the base 26. This enables a user to control the device via readily accessible switches, without needing to remove the cap assembly 24. The switches 40 and 65 are each operable to control delivery of electric power from the batteries to the LEDs 34A, 34B and 34C. The circuit 29 is only rendered operative when there is insufficient light, that is, by operation of a light sensitive switch, ie the diode 43.

Figure 10:
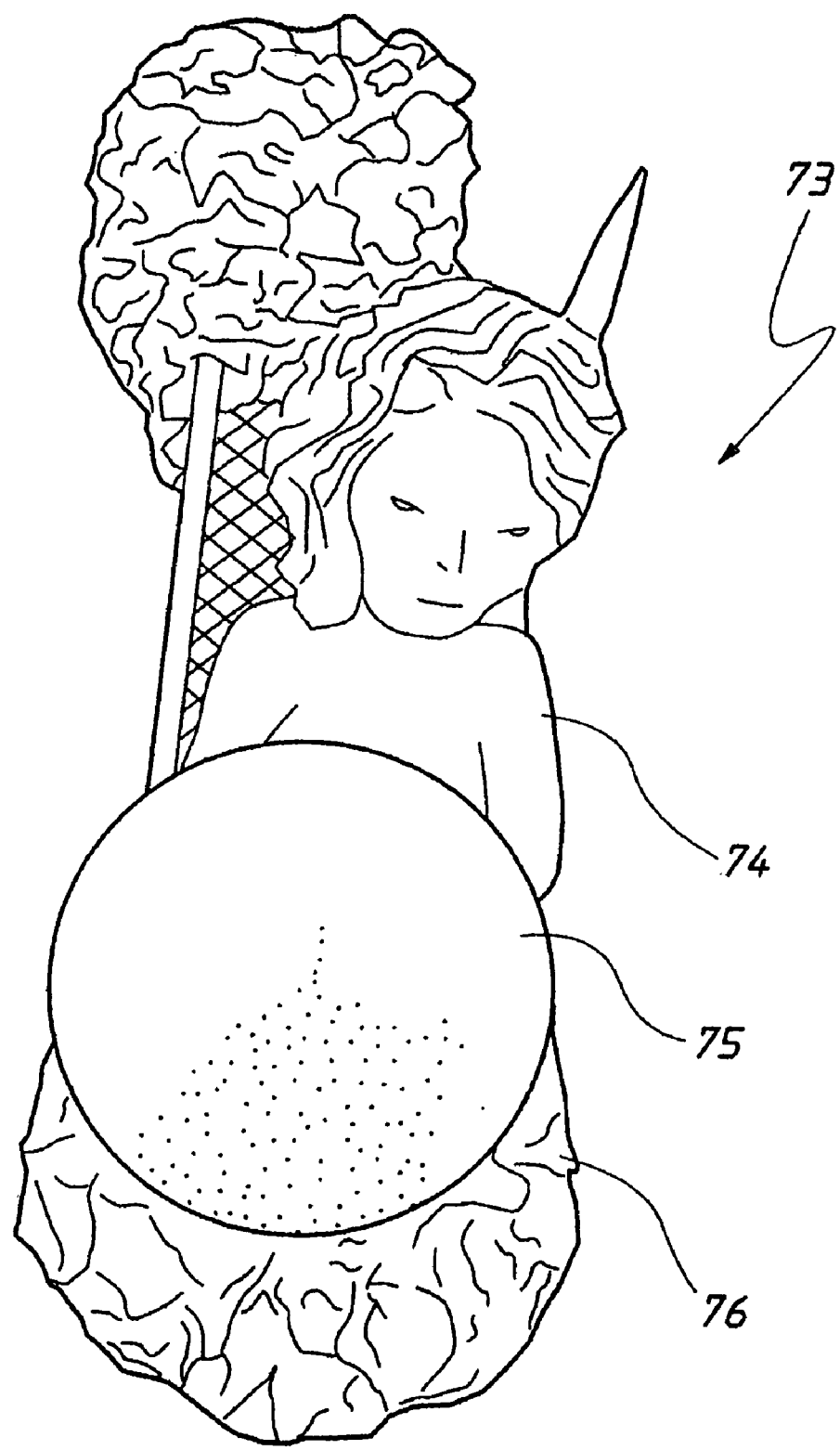
FIG. 10 is a schematic perspective view of an ornamental garden light.

The embodiment of FIG. 10 includes an ornamental garden light 73 having a body or base 74. The base 74 would be at least partly hollow so as to contain the circuitry of FIG. 9, except for the solar cell 30. The solar cell 30 would be mounted so as to be exposed to sunlight. The switches 40 and 65 would be mounted at an external surface of the base 74.

The switch 40 and/or switch 65 would be mounted on an external surface of the base 74, while the diode 42 would be exposed to sunlight.

The base 74 includes a spherical lens 75 secured to a horizontal portion 76 of the base 74. The horizontal portion 76 would have mounted in it the LEDs 34A, 34B and 34C so as to deliver light to the interior of the lens 75.

In FIGS. 11 to 13 there is schematically depicted a lighting device 100 that is a modification of the previously described lighting devices.

The lighting device 100 employs the circuit of FIG. 9.

In this embodiment, the lighting device 100 includes a lens 101 of generally spherical form consisting of a lower portion 102 fixed to an upper portion 103. A skirt 104 abuts the lower portion 102.

The base 106 includes a battery compartment 110 providing a cavity 111 within which a battery holder 112 is located and supports the batteries 33. The battery compartment 110 is closed by a closure member 109 that acts as a cap or lid closing the cavity 111. The member 109 includes a pad 113 that abuts the batteries 33 to aid in retaining them in position.

A spike 105 extending from the closure member 109 and is provided to penetrate an earth surface to secure the device 100 in position.

The member 109 has a socket 107 within which the upper portion of the spike 105 is slidably received. The spike 105 engages the skirt 104 and holds the skirt 104 abutting the lower portion 102.

Flanges 108 extend from the socket 107 and are fixed to an upper flange 120 of the closure member 109 to reinforce the socket 107.

The lens 101 encloses a chamber 114 to which the solar cell 30 is exposed so that the solar cell 30 receives light through the lens 101. Located adjacent the solar cell 30 but not illustrated is a circuit board having the circuit 29.

Mounted on the battery compartment 110 are the LEDs 34a, 34b and 34c that are protected by means of a translucent diffuser 115.

Mounted on the battery compartment 110 is the switch 40 and/or switch 65 of the circuit 29.

The battery compartment 110 includes a generally circular internally threaded flange 116 that threadably engages a circular flange 117 of the base 106.

In respect of the above preferred embodiment, the battery compartment 110 is integrally formed with the lower portion 102 and engages the base 106 by means of an annular seal 118 to sealingly connect the base 106 to the battery compartment 110.

To provide access to the batteries 33 and switches 40 and 65, the lens 101 is rotated about the axis 119 relative to the base 106 so there is relative movement between the flanges 116 and 117. This relative movement removes the base 106 from the lens 101. Accordingly a user may then manipulate the switches 40 and 65.

In the above embodiment, the member 109 is moved relative to the base 106 from a closed position, relative to the cavity 111, to at least a partly open position providing access to the switches 40 and 65.

The invention claimed is:

1. A lighting device to produce light, said device including:
   a base;
   a lens mounted on the base and generally enclosing a chamber;
   a circuit having at least one lamp to produce a light, the lamp being mounted to direct light into said chamber, connections for at least one rechargeable battery to power the circuit and a solar cell exposed to said chamber so as to receive light passing through said lens and operatively associated with the connections to charge the battery, and a primary switch operable to control said circuit;
   a battery compartment including a cavity to receive said battery and having said connections;
   a closure member attached to said compartment but movable relative thereto to expose said cavity to provide for insertion of said battery; and wherein
   said switch is exposed to said cavity so that upon movement of said closure member to expose said cavity, a user has access to said switch to operate the switch.

2. The lighting device of claim 1, wherein said device has at least two lamps to produce light of a desired colour including a varying colour.

3. The lighting device of claim 2 wherein, said circuit includes a light sensitive switch that renders the circuit operative at low light levels.

4. The lighting device of claim 3 wherein, said circuit includes a light sub-circuit connected to the lamps to deliver electric power thereto so that the lamps produce said desired colour, with said primary switch being an on/off switch to deliver electric power from the batteries to said sub-circuit.

5. The lighting device of claim 4 wherein, said circuit includes a light sub-circuit having an integrated circuit operable to select a desired fixed colour, with said integrated circuit being connected to a sub-circuit switch, the sub-circuit switch being operable to select said desired fixed colour.

6. The device of claim 3 wherein, said circuit includes a sub-circuit, said primary switch is a first switch with said first switch being an on/off switch to deliver electric power from the battery to said sub-circuit, and wherein said sub-circuit includes an integrated circuit and a second switch connected to said integrated circuit, the second switch being operable to select a desired fixed colour and exposed to provide for access thereto by a user.

7. The device of claim 6 wherein, said second switch is exposed to said chamber.

8. The lighting device of claim 7 wherein, said lens is fixed to said battery compartment and said battery compartment threadably engages said closure member so that relative rotation between the closure member and said compartment moves said closure member between an open position exposing said cavity and a closed position closing said cavity.

9. The device of claim 8, wherein said closure member includes a socket, and said device includes a spike engaged in said socket and projecting therefrom to provide for the spike to be inserted in a ground surface so that the device is supported thereby.

10. The lighting device of claim 2 wherein, said circuit includes a light sub-circuit connected to the lamps to deliver electric power thereto so that the lamps produce said desired colour, with said switch being an on/off switch to deliver electric power from the batteries to said sub-circuit.

11. The lighting device of claim 2 wherein, said circuit includes a light sub-circuit having an integrated circuit operable to select a desired fixed colour, with said switch being connected to said integrated circuit and operable to select said desired fixed colour.

12. The device of claim 2 wherein, said circuit includes a sub-circuit, said switch is a first switch with said first switch being an on/off switch to deliver electric power from the battery to said sub-circuit, and wherein said sub-circuit includes an integrated circuit and a second switch connected to said integrated circuit, the second switch being operable to select a desired fixed colour and exposed to provide for access thereto by a user.

13. A lighting device to produce light of varying colour, said device comprising:
   a lens generally enclosing a chamber;
   a circuit including:
      at least two lamps of different colours to produce a desired colour including a varying colour, the lamps being mounted to direct light into said chamber;
      connections for at least one rechargeable battery to power the circuit;
      a solar cell mounted on a surface so as to be exposed to light and operatively associated with the connections to charge the battery;
      a light sub-circuit having an integrated circuit for controlling said lamps, and a selection switch, said selection switch being connected to said integrated circuit and operable to select a desired fixed colour; and
      a volatile memory retained for a period of time and associated with said integrated circuit, said memory causing operation of said circuit to produce said desired fixed colour.

14. The device according to claim 13, wherein said memory is a switch.

15. The device according to claim 13, wherein said memory forms a portion of said integrated circuit.

16. The device according to claim 13, wherein said light sub-circuit is connected to said lamps to deliver electric power thereto, so that the lamps produce said desired colour.

17. The device according to claim 13, further comprising an on/off switch operable to control delivery of electric power from said battery to the sub-circuit.

18. The device according to claim 13, wherein said circuit includes a light sensitive switch that renders the circuit operative at low light levels.

19. The device according to claim 13, further comprising: a voltage cut-off sub-circuit, wherein said cut-off sub-circuit interrupts delivery of power to said lamps, upon a voltage in said cut-off sub-circuit reaching a predetermined threshold.

20. The device according to claim 19, wherein said voltage cut-off sub-circuit forms a portion of said integrated circuit.

21. The device according to claim 19, wherein said circuit further comprises: a capacitor, wherein said capacitor is arranged to store charge when an output voltage of said battery is greater than a stored charge on said capacitor and discharge charge when said output voltage of said battery is lower than said stored charge.

22. The device according to claim 21, wherein said voltage cut-off sub-circuit prevents said capacitor from discharging further stored charge, upon a voltage in said cut-off sub-circuit reaching a predetermined threshold, such that a retained stored charge on said capacitor provides sufficient voltage to said memory to retain the selected desired colour for a period of time.

23. The device according to claim 22, wherein said retained stored charge is substantially zero volts.

24. A lighting device to produce light of varying colour, said device comprising:
- a lens generally enclosing a chamber;
- a circuit including:
  - at least two lamps of different colours to produce a desired colour, the lamps being mounted to direct light into said chamber;
  - connections for at least one rechargeable battery to power the circuit;
  - a solar cell mounted on a surface so as to be exposed to light and operatively associated withthe connections to charge the battery;
  - a light sub-circuit having an integrated circuit for controlling said lamps to produce lighting effects, and a selection switch, said selection switch being connected to said integrated circuit and operable to select a desired lighting effect; and
  - a volatile memory retained for a period of time and associated with said integrated circuit, said memory causing operation of said circuit to produce said lighting effects.

25. The device according to claim 24, wherein said lighting effect is selected from the group of lighting effects consisting of: a specific colour changing effect, a colour brightness effect, a colour changing frequency effect, a colour changing sequence effect, and a colour light intensity effect.

26. The device according to claim 24, wherein said desired colour includes a varying colour.

27. A lighting device to produce light of varying colour, said device including:
- a lens;
- a circuit having
  - at least two lamps of different colours to produce a varying colour, said lamps being mounted to direct light through said lens,
  - connections for at least one rechargeable battery to power said circuit,
  - a solar cell mounted so as to be exposed to light and operatively associated with said connections to charge said battery, and
  - a user operated switch operable to control said circuit, with said switch being accessible by a user thereby enabling said user to manipulate said switch to control delivery of power to said lamps; and a spike for positioning said connections above a ground surface.

28. The lighting device of claim 27, wherein said circuit includes a light sub-circuit connected to said lamps to deliver power thereto so that said lamps produce a desired color, with said switch controlling said sub-circuit.

29. The lighting device of claim 27, wherein said circuit includes a light sub-circuit connected to said lamps to deliver power thereto so that said lamps produce light, with said switch being an on/off switch to deliver power from said battery to said sub-circuit.

30. The lighting device of claim 27, wherein any one of said at least two lamps is a single diode that emits light when energized, and wherein said at least two lamps are at least three lamps comprising a diode that emits red light, a diode that emits blue light and a diode that emits green light.

31. The lighting device of claim 27, wherein said circuit includes a light sub-circuit connected to said lamps to deliver power thereto, wherein said light sub-circuit varies said power to each of said lamps so as to vary both intensity of light emitted and frequency of changes to said intensity to produce a continuous color changing cycle.

32. A lighting device to produce light of varying color, said device including:
- a lens;
- a circuit having
  - at least two lamps of different colors mounted to direct light through said lens,
  - an activation sub-circuit to provide power to said lamps only at low light levels, and
  - a light sub-circuit to independently control delivery of power to each of said lamps so as to vary intensity of light emitted over time to produce a continuous color changing cycle,
  - connections for at least one rechargeable battery to power said circuit, and
  - at least one solar cell mounted so as to be exposed to light and operatively associated with said connections to charge said battery; and a spike for positioning said connections above a ground surface.

33. The lighting device of claim 32, further comprising at least one user operated switch operable to control said circuit, with said switch being accessible by said user thereby enabling said user to manipulate said switch to control delivery of power to said lamps.

34. The lighting device of claim 32, wherein said light sub-circuit further independently controls delivery of power to each of said lamps so as to vary frequency of changes to said intensity.

35. A lighting device to produce light of varying color, said device including:
- a body including a post;
- a lens connected to said body;
- a circuit having:
  - a plurality of lamps of different colors to produce a varying color, said lamps being mounted to direct light through said lens,
  - connections for at least one rechargeable battery to power said circuit,
  - a solar cell mounted so as to be exposed to light and operatively associated with said connections to charge said battery, and
  - at least one user operated switch operable to control said circuit, with said switch being accessible by a user thereby enabling said user to manipulate said switch to control delivery of power to said lamps.

* * * * *